United States Patent
Blumendeller et al.

(10) Patent No.: US 9,228,508 B2
(45) Date of Patent: Jan. 5, 2016

(54) METHOD FOR DETERMINING THE LOW PRESSURE EXHAUST GAS RECIRCULATION MASS FLOW IN THE AIR SYSTEM OF AN INTERNAL COMBUSTION ENGINE

(75) Inventors: Wilhelm Blumendeller, Freiberg (DE); Thomas Bleile, Stuttgart (DE); Arvid Sievert, Esslingen (DE); Martin Hoerner, Stuttgart (DE); Rene Huck, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 856 days.

(21) Appl. No.: 13/450,747

(22) Filed: Apr. 19, 2012

(65) Prior Publication Data

US 2012/0272938 A1    Nov. 1, 2012

(30) Foreign Application Priority Data

Apr. 29, 2011 (DE) .......................... 10 2011 017 779

(51) Int. Cl.
*F02D 21/08* (2006.01)
*F02D 41/00* (2006.01)
*F02M 25/07* (2006.01)

(52) U.S. Cl.
CPC ............ *F02D 21/08* (2013.01); *F02D 41/0002* (2013.01); *F02D 41/0007* (2013.01); *F02D41/0072* (2013.01); *F02D 2200/0402* (2013.01); *F02M 25/0707* (2013.01); *F02M 25/0709* (2013.01); *F02M 25/0713* (2013.01); *F02M 25/0728* (2013.01); *F02M 25/0732* (2013.01); *Y02T 10/47* (2013.01)

(58) Field of Classification Search
CPC ................ F02D 21/08; F02D 41/0072; F02D 2200/0402; F02D 21/083; F02D 41/0007; F02D 41/0002; F02M 25/0709; F02M 25/0713
USPC ............. 123/568.11, 568.12, 568.15, 568.21; 701/108; 60/605.2, 278
See application file for complete search history.

(56) References Cited

U.S. PATENT DOCUMENTS 7,367,188 B2 * 5/2008 Barbe et al. .................. 60/605.2
7,512,479 B1 * 3/2009 Wang ............................ 701/103

(Continued)

OTHER PUBLICATIONS

Cao B., Li T., Zhang, C.; Fuzzy Information and Engineering; 2009; Springer; vol. 2; p. 1259.*

*Primary Examiner* — Mahmoud Gimie
(74) *Attorney, Agent, or Firm* — Michael Best & Friedrich LLP

(57) ABSTRACT

In a method for determining a low pressure exhaust gas recirculation mass flow $\dot{m}_{Opt}$ in the air system of an internal combustion engine (10) with low pressure exhaust gas recirculation, the determination of the low pressure exhaust gas recirculation mass flow $\dot{m}_{Opt}$ involves a preliminary low pressure exhaust gas recirculation mass flow $\dot{m}_{EGRLPDs}$ which is determined from a function involving, in particular, the pressure $p_{42}$ upstream and the pressure $p_{12}$ downstream of a low pressure side exhaust gas recirculation valve EGRVlvLP (29), the temperature $T_{EGRVlvPUs}$ downstream of the low pressure side exhaust gas recirculation valve (29), and the geometry $ar_{EGRVlvLP}$ of the low pressure side exhaust gas recirculation valve (29). According to the invention, at least one mass balance based variable is also considered in the determination of the low pressure exhaust gas recirculation mass flow $\dot{m}_{Opt}$.

17 Claims, 1 Drawing Sheet

(56) References Cited

U.S. PATENT DOCUMENTS

| | | | |
|---|---|---|---|
| 8,646,271 B2 * | 2/2014 | Yasui et al. | 60/605.2 |
| 2003/0079721 A1 * | 5/2003 | Kolmanovsky et al. | 123/399 |
| 2004/0084015 A1 * | 5/2004 | Sun et al. | 123/399 |
| 2007/0079614 A1 * | 4/2007 | Barbe et al. | 60/605.2 |
| 2012/0137680 A1 * | 6/2012 | Nam | 60/605.2 |
| 2012/0325188 A1 * | 12/2012 | Auckenthaler | 123/568.21 |
| 2015/0053186 A1 * | 2/2015 | Surnilla et al. | 123/568.21 |

* cited by examiner

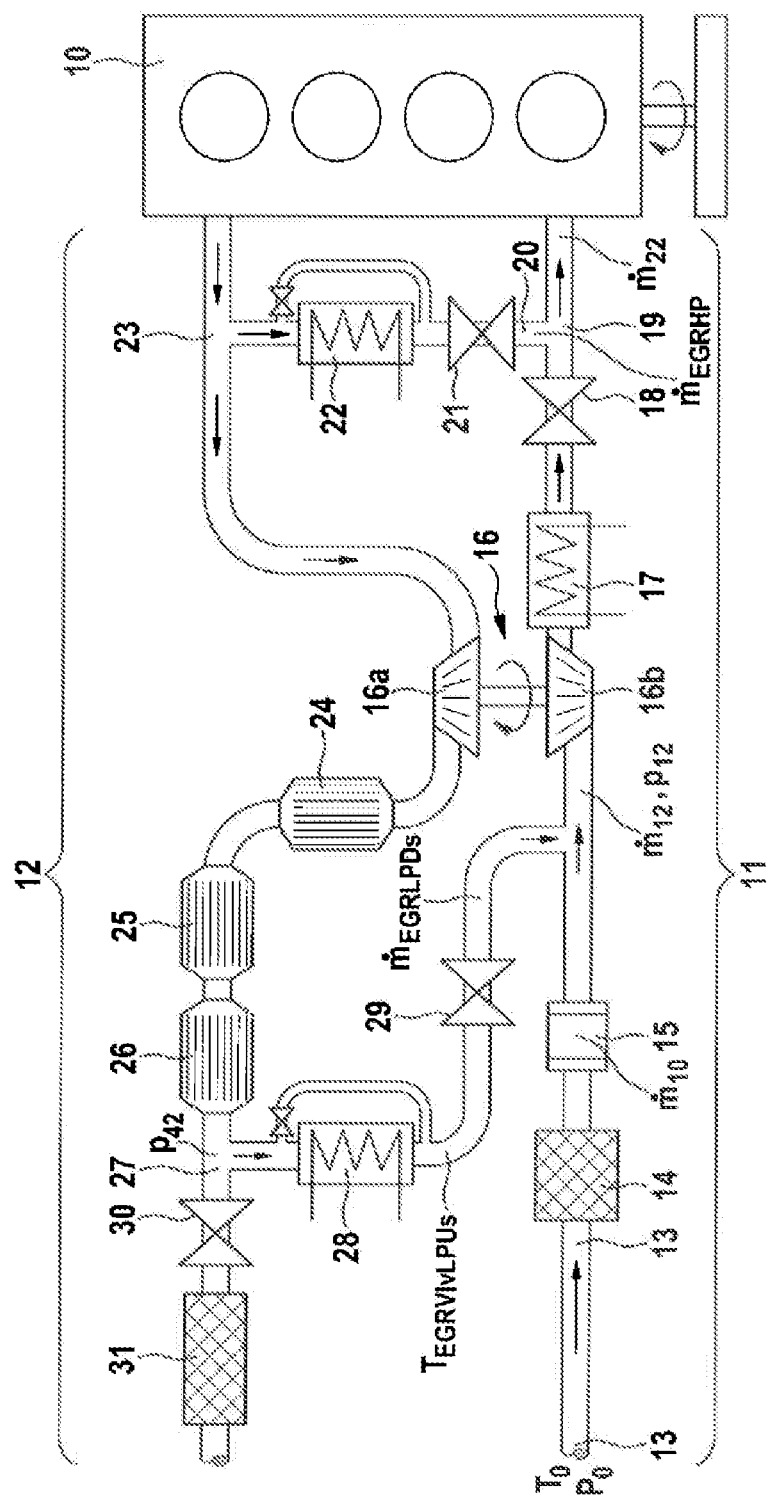

METHOD FOR DETERMINING THE LOW PRESSURE EXHAUST GAS RECIRCULATION MASS FLOW IN THE AIR SYSTEM OF AN INTERNAL COMBUSTION ENGINE

BACKGROUND

The present invention relates to a method for determining the low pressure exhaust gas recirculation mass flow in the air system of an internal combustion engine.

Exhaust gas recirculation comprises an important measure for reducing the nitrogen oxide emissions which are produced upon the combustion of fuel in internal combustion engines. This measure enables the recirculation of a portion of the exhaust gas into the inlet space of the internal combustion engine. Production of nitrogen oxides during combustion is lessened by the recirculation of a portion of the exhaust gas which, being an inert gas, is nonreactive. Usually, the exhaust gas is recirculated into the inlet space by mixing in some of the exhaust gas of the inlet fresh air. An exhaust gas recirculation valve is provided for the metering of the exhaust gas. Also known in addition to a near engine high pressure exhaust gas recirculation system is a low pressure exhaust gas recirculation system in which, as a rule, the exhaust gas recirculation section is implemented downstream of a diesel particulate filter and upstream of a compressor.

Controlling the exhaust gas recirculation system requires the detection of various mass flows. The mass flow via the low pressure exhaust gas recirculation line is usually modeled, the low pressure exhaust gas recirculation mass flow being determined by means of a so-called throttle equation which involves the pressure upstream and the pressure downstream of the low pressure side exhaust gas recirculation valve, the temperature upstream of the low pressure side exhaust gas recirculation valve, and the geometry of the low pressure side exhaust gas recirculation valve. The problem arises in this case that generally only small pressure drops are present across the low pressure exhaust gas recirculation valve, and so this determination of the mass flow is strongly subject to tolerances, depending on the operating point.

SUMMARY

By contrast therewith, it is the object of the present invention to improve the determination of the low pressure exhaust gas recirculation mass flow and, in particular, to decrease the tolerance of the mass flow determination.

This object is achieved by a method for determining the low pressure exhaust gas recirculation mass flow.

The inventive method for determining the low pressure exhaust gas recirculation mass flow $\dot{m}_{Opt}$ in the air system of an internal combustion engine with low pressure exhaust gas recirculation proceeds from a determination of the low pressure exhaust gas recirculation mass flow $\dot{m}_{Opt}$ on the basis of a preliminary low pressure exhaust gas recirculation mass flow $\dot{m}_{EGRLPDs}$ which is determined from a function involving the pressure p42 upstream and the pressure p12 downstream of a low pressure side exhaust gas recirculation valve EGRVIvLP, the temperature TEGRVIvPUs upstream of the low pressure side exhaust gas recirculation valve, and the geometry arEGRVIvLP of the low pressure side exhaust gas recirculation valve. This preliminary low pressure exhaust gas recirculation mass flow $\dot{m}_{EGRLPDs}$ is determined, for example, with the aid of the throttle equation $$\dot{m}_{EGRLPDs} = f_1(p_{42}, p_{12}, T_{EGRVIvPUs}, ar_{EGRVIvLP})$$

According to the invention, the determination of the low pressure exhaust gas recirculation mass flow $\dot{m}_{Opt}$ also involves a mass balance based variable. It is possible hereby to determine and/or model the low pressure exhaust gas recirculation mass flow $\dot{m}_{Opt}$ more accurately and in a way less subject to tolerances than exclusively with the aid of the throttle equation. Since the low pressure exhaust gas recirculation mass flow thereby optimally estimated is an important input variable for the controller of the combustion, the engine controller can be improved with the aid of the inventively determined low pressure exhaust gas recirculation mass flow so that it is possible to decrease nitrogen oxide emissions and, if appropriate, likewise to decrease the fuel consumption. The mass balance based variable is, in particular, a variable involving various mass flows, or one which is influenced by various mass flows or, for example, characterizes the mass flow ratios.

The mass balance based variable is preferably taken into account for determining the low pressure exhaust gas recirculation mass flow $\dot{m}_{Opt}$ in that the mass balance based variable is a modeled mass flow $\dot{m}_{EGRLPPTN}$. This mass balance based variable takes account, in particular, of the mass flows on the air feed side of the air system. Account is preferably taken hereby of the mass flow at the inlet of the internal combustion engine and/or the high pressure side exhaust gas recirculation mass flow and/or the fresh air mass flow. The mass balance based variable can be modeled as mass flow $\dot{m}_{EGRLPPTN}$ from these mass flows.

Depending on the operating point and the tolerances of the input variables of the two modeled mass flows $\dot{m}_{EGRLPDs}$ and $\dot{m}_{EGRLPPTN}$, it is possible to estimate an optimum low pressure side exhaust gas recirculation mass flow $\dot{m}_{Opt}$ which results from a suitable weighting of the two modeled mass flows. This is preferably performed using the formula $$\dot{m}_{Opt} = c_1 * \dot{m}_{EGRLPDs} + (1 - c_1) * \dot{m}_{EGRLPPTN}.$$

Here, c1 is a weighting factor. This weighting factor is preferably selected as a function of the standard deviations of the two modeled mass flows $\dot{m}_{EGRLPDs}$ and $\dot{m}_{EGRLPPTN}$, the value with the smaller standard deviation being given the higher weight.

The variables involved in determining the mass balance based mass flow $\dot{m}_{EGRLPPTN}$ can be one or more of the following variables:

a measured or modeled mass flow $\dot{m}_{22}$ at the inlet of the internal combustion engine, $\dot{m}_{22}$ being a function of the air consumption and/or the engine speed and/or the engine volume and/or the temperature at the inlet of the internal combustion engine and/or the pressure at the inlet of the internal combustion engine;

a measured or modeled high pressure exhaust gas recirculation mass flow $\dot{m}_{EGRHP}$;

a dynamic correction variable $$\frac{d}{dt} M_{21},$$

which is a function of the volume between a compressor and a throttle valve of the air system;

a measured or modeled fresh air mass flow $\dot{m}_{10}$.

In this case, the mass balance based mass flow $\dot{m}_{EGRLPPTN}$ is determined, in particular, with the aid of the formula $$\dot{m}_{EGRLPPTN} = \dot{m}_{22} - \dot{m}_{EGRHP} + \frac{d}{dt}M_{21} - \dot{m}_{10}.$$

This can be performed with particular ease and advantage when the high pressure side exhaust gas recirculation valve is closed and the entire exhaust gas recirculation mass flow is led via the low pressure side exhaust gas recirculation line.

The tolerances can be defined in the form of standard deviations ($\sigma$). This results in $$\sigma_{\dot{m}_{EGRLPPTN}} = f_3\left(\sigma_{\dot{m}_{22}}, \sigma_{\dot{m}_{EGRHP}}, \sigma_{\frac{d}{dt}M_{21}}, \sigma_{\dot{m}_{10}}\right)$$

for the standard deviation of the mass flow $\dot{m}_{EGRLPPTN}$ as mass balance based variable. The low pressure side preliminary exhaust gas recirculation mass flow $\dot{m}_{EGRLPDs}$, which is used together with the mass balance based variable for the inventive optimum estimation of the low pressure exhaust gas recirculation mass flow $\dot{m}_{Opt}$ can preferably be determined with the aid of the formula $$\dot{m}_{EGRLPDs} = c_2 \sqrt{\frac{1}{T_{EGRVlvLPUs}}} * p_{42} * ar_{EGRVlvLP} * \varphi\left(\frac{p_{12}}{p_{42}}\right)$$

as throttle equation. The standard deviation in the determination of the preliminary low pressure side exhaust gas recirculation mass flow $\dot{m}_{EGRLPDs}$ results hereby as follows, in particular:

$$\sigma_{\dot{m}_{EGRLPDs}} = f_4(\sigma_{p42}, \sigma_{p12}, \sigma_{ar_{EGRVlvLP}}, \sigma_{T_{EGRVlvPUs}})$$

The standard deviations determined in such a way in modeling $\dot{m}_{EGRLPPTN}$ and $\dot{m}_{EGRLPDs}$ are, as explained above, involved in the weighting of the two modeled values for estimating the optimum estimated low pressure exhaust gas recirculation mass flow $\dot{m}_{Opt}$, in which case the value with the smaller standard deviation is given the higher weight in accordance with $$c_1 = f_5(\sigma_{\dot{m}_{EGRLPPTN}}, \sigma_{\dot{m}_{EGRLPDs}})$$

In a further step, the input variables of the throttle equation can be adjusted in accordance with the standard deviation and sensitivity so that all the variables satisfy the throttle equation with one another, in particular in accordance with the following formula $$\dot{m}_{Opt} = f_6(p_{42} + p_{Err,p42}, p_{12} + p_{Err,p12}, T_{EGRVlvLPUs} + T_{Err,TEGRVlvLPUs}, ar_{EGRVlvLPs} + ar_{Err,arEGRVlvLP})$$

It holds in this case that the input variables of the throttle equation with small standard deviations are less adjusted, and the variables with larger standard deviations are more adjusted. In addition, it is taken into account that, in accordance with the operating point, a low sensitivity of the input variables has a larger adjustment, and a high sensitivity has a smaller adjustment of the input variables, as a result.

The invention further comprises a computer program which executes all the steps of the inventive method when it is executed on an arithmetic unit or a controller. Finally, the invention comprises a computer program product with program code, which is stored on a machine readable carrier, for carrying out the described method when the program is executed on an arithmetic unit or a controller. The implementation of the inventive method as a computer program and/or as a computer program product has the advantage that, for example, by recording the computer program in the controller of an internal combustion engine or in another control unit of the motor vehicle it is possible to use the advantages of the inventive method during operation of the internal combustion engine straight away so that the estimate of the low pressure side exhaust gas recirculation mass flow can be improved and the tolerance decreased. This better estimate of the low pressure side exhaust gas recirculation mass flow permits an improved control of the combustion, as a result of which the emissions can be decreased and the fuel consumption reduced. The inventive method can therefore also be used with particular advantage in the case of already existing motor vehicles.

Further features and advantages of the invention emerge from the following description of an exemplary embodiment in conjunction with the drawing. The individual features will respectively be implemented here on their own or in combination with one another.

BRIEF DESCRIPTION OF THE DRAWING

The FIGURE shows a diagrammatic overview of the air system of an internal combustion engine with high pressure side and low pressure side exhaust gas recirculation.

DETAILED DESCRIPTION

The overview, shown in the FIGURE, of an air system of an internal combustion engine constitutes merely one example of such an air system, in the case of which the inventive method can be used with advantage. The inventive method is, however, in no way limited to such an air system. In the case of other arrangements, as well, the inventive method can be used with advantage for optimum estimation of the low pressure side exhaust gas recirculation mass flow.

The FIGURE shows an internal combustion engine 10 and its air system, which is subdivided into an air feed region 11 and an exhaust gas region 12. The fresh air, which is eventually fed to the internal combustion engine 10, is inlet at the point 13, where an output temperature TO (ambient temperature) and an output pressure p0 (ambient pressure) prevail. The inlet air traverses an air filter 14 before the fresh air mass flow $\dot{m}_{10}$ is measured at the fresh air mass sensor 15, or otherwise determined. Provided in the direction of the internal combustion engine 10 in the air feed line is a compressor 16b which is driven by a turbine 16a, which is arranged in the exhaust gas region 12, so that the air can be blown into the internal combustion engine 10 at a higher pressure. The turbine 16a and the compressor 16b are part of an exhaust gas turbocharger known per se. An air cooler 17 can be provided upstream of the throttle valve 18. The air passes into the internal combustion engine 10 via the inlet tube 19. The mass flow, denoted by $\dot{m}_{22}$, in the inlet pipe 19 of the internal combustion engine 10 is a function of the air consumption, the engine speed, temperature and the pressure in the inlet of the internal combustion engine, and of the engine volume. Provided for decreasing the emissions is an exhaust gas recirculation which is subdivided into a high pressure side, and a low pressure side exhaust gas recirculation. Opening into the inlet pipe 19 is the high pressure side exhaust gas recirculation line 20. The quantity of the exhaust gas recirculated on the high pressure side is set via an exhaust gas recirculation valve EGRVlv 21. An exhaust gas cooler 22 is provided for cooling the high pressure side recirculated exhaust gas. On the exhaust gas side 12 of the air system of the internal combustion engine 10, the exhaust gas traverses the turbine 16a downstream of a branch 23 of the high pressure side exhaust gas recirculation before it traverses, for example, an oxidation catalyst 24, a NOx storage catalyst 25 and a diesel particulate filter 26. Located downstream thereof is the branch 27 of the low pressure side exhaust gas recirculation. The low pressure side exhaust gas recirculation mass flow is set after passage through an exhaust gas cooler 28 by means of a low pressure side exhaust gas recirculation valve EGRVIvLP 29. The exhaust gas emission from the exhaust silencer 31 can be set via a further valve 30.

The conventional way to determine the low pressure side exhaust gas recirculation mass flow $\dot{m}_{EGRLPDs}$, which is designated with reference to the invention as a preliminary low pressure exhaust gas recirculation mass flow, is to use a function which involves the pressure p42 at the branch 27 of the low pressure side exhaust gas recirculation, the pressure p12 downstream of the low pressure side exhaust gas recirculation valve EGRVIvLP 29, the temperature TEGRVIvLPUs upstream of the low pressure side exhaust gas recirculation valve 29 and downstream of the exhaust air cooler 28, and the geometry arEGRVIvLP of the exhaust gas recirculation valve 29. The low pressure side exhaust gas recirculation mass flow $\dot{m}_{EGRLPDs}$ can be determined hereby, in particular, with the aid of the formula $$\dot{m}_{EGRLPDs} = c_2 \sqrt{\frac{1}{T_{EGRVIvLPUs}}} * p_{42} * ar_{EGRVIvLP} * \varphi\left(\frac{p_{12}}{p_{42}}\right)$$

However, such a function, which is also denoted as a throttle equation, can be used to determine the low pressure side exhaust gas recirculation mass flow only inaccurately, and so the value which can be determined in this way is strongly subject to tolerances depending on the operating point. So as to estimate the low pressure side exhaust gas recirculation mass flow optimally, according to the invention further information is also used in the estimate. In particular, account is further taken of at least one mass balance based variable which involves, in particular, various mass flows on the air feed side of the air system. It is possible hereby to estimate an optimum low pressure exhaust gas recirculation mass flow $\dot{m}_{Opt}$ which permits an improved control of the combustion in the internal combustion engine 10.

Mass flows on the air feed side of the air flow are preferably involved in determining the mass balance based variable as a modulated mass flow in $\dot{m}_{EGRLPPTN}$. The mass flow $\dot{m}_{22}$ at the inlet of the internal combustion engine is preferably involved in the modeling of the mass flow $\dot{m}_{EGRLPPTN}$. The high pressure side exhaust gas recirculation mass flow $\dot{m}_{EGRHP}$, which is fed to the inlet pipe 19 is subtracted from this mass flow. Further involved is a dynamic correction $$\frac{d}{dt}M_{21}$$

which takes account of the volume between the compressor 16b and the throttle valve 18. Finally, in order to determine the mass balance based variable account is taken of the measured or modeled fresh air mass flow $\dot{m}_{10}$, which is likewise subtracted. The mass balance based variable can be determined with particular reliability and accuracy when the exhaust gas recirculation is led exclusively via the low pressure side exhaust gas recirculation line.

A weighting of the two modeled mass flows, that is to say the mass balance based variable $\dot{m}_{EGRLPPTN}$, and of the preliminary low pressure side exhaust gas recirculation mass flow $\dot{m}_{EGRLPDs}$, which can be determined with the aid of the throttle equation, can be undertaken by taking account of the standard deviations a of the two modelings, the value with the smaller standard deviation being given the higher weight.

It is possible with particular advantage for the input variables of the throttle equation to be adjusted in accordance with the standard deviation and sensitivity of the different variables such that all the variables satisfy the throttle equation with one another. It holds in this case that the input variables of the throttle equation with small standard deviations are less adjusted, and the variables with larger standard deviations are more adjusted. In addition, it is taken into account that, in accordance with the operating point, a low sensitivity of the input variables has a larger adjustment, and a high sensitivity has a smaller adjustment of the input variables, as a result.

What is claimed is:

1. A method for determining a low pressure exhaust gas recirculation mass flow $\dot{m}_{Opt}$ in an air system of an internal combustion engine (10) with low pressure exhaust gas recirculation, determining by a controller the low pressure exhaust gas recirculation mass flow $\dot{m}_{Opt}$ based on a preliminary low pressure exhaust gas recirculation mass flow $\dot{m}_{EGRLPDs}$ using a function involving a pressure $p_{42}$ upstream and a pressure $p_{12}$ downstream of a low pressure side exhaust gas recirculation valve EGRVIvLP (29), a temperature $T_{EGRVIvPUs}$ upstream of the low pressure side exhaust gas recirculation valve (29), and a geometry $ar_{EGRVIvLP}$ of the low pressure side exhaust gas recirculation valve (29), characterized in that the controller determines the low pressure exhaust gas recirculation mass flow $\dot{m}_{Opt}$ using a mass balance based variable which is a modeled mass flow $\dot{m}_{EGRLPPTN}$ which involves mass flows on an air feed side of the air system;

wherein the controller determines the low pressure exhaust gas recirculation mass flow $\dot{m}_{Opt}$ using a weighting of the preliminary low pressure exhaust gas recirculation mass flow $\dot{m}_{EGRLPDs}$ and the mass balance based mass flow $\dot{m}_{EGRLPPTN}$; and wherein the controller controls a combustion of the internal combustion engine by controlling the low pressure exhaust gas recirculation based on the determined low pressure exhaust gas recirculation mass flow $\dot{m}_{Opt}$.

2. The method according to claim 1, characterized in that the mass flows on the air feed side of the air system includes at least one of a mass flow at the inlet of the internal combustion engine (10), a high pressure side exhaust gas recirculation mass flow, and a fresh air mass flow.

3. The method according to claim 1, characterized in that the mass flows on the air feed side of the air system includes a mass flow at the inlet of the internal combustion engine (10).

4. The method according to claim 1, characterized in that the mass flows on the air feed side of the air system includes a high pressure side exhaust gas recirculation mass flow.

5. The method according to claim 1, characterized in that the mass flows on the air feed side of the air system includes a fresh air mass flow.

6. The method according to claim 1, characterized in that the low pressure exhaust gas recirculation mass flow $\dot{m}_{Opt}$ is determined using the formula $$\dot{m}_{Opt} = C_1 * \dot{m}_{EGRLPDs} + (1-C_1) * \dot{m}_{EGRLPPTN}$$

$C_1$ being a weighting factor.

7. The method according to claim 6, characterized in that the weighting factor is selected as a function of standard deviations of the determination of the preliminary low pressure exhaust gas recirculation mass flow $\dot{m}_{EGRLPDs}$ and of the mass balance based mass flow $\dot{m}_{EGRLPPTN}$, the value with the smaller standard deviation being given a higher weight.

8. The method according to claim 1 characterized in that the determination of the mass balance based mass flow $\dot{m}_{EGRLPPTN}$ involves:
- a mass flow $\dot{m}_{22}$ at an inlet of the internal combustion engine (10), which is a function of the air consumption and/or an engine speed and/or an engine volume and/or a temperature at the inlet of the internal combustion engine (10) and/or a pressure at the inlet of the internal combustion engine (10), and/or
- a measured or modeled high pressure exhaust gas recirculation mass flow $\dot{m}_{EGRHP}$ and/or
- a measured or modeled fresh air mass flow $\dot{m}_{10}$ and/or
- a dynamic correction variable $$\frac{d}{dt} M_{21},$$

which is a function of a volume between a compressor (16b) and a throttle valve (18) of the air system.

9. The method according to claim 8, characterized in that the mass flow $\dot{m}_{22}$ is measured.

10. The method according to claim 8, characterized in that the mass flow $\dot{m}_{22}$ is modeled.

11. The method according to claim 8, characterized in that the mass balance based mass flow $\dot{m}_{EGRLPPTN}$ is determined with the formula $$\dot{m}_{EGRLPPTN} = \dot{m}_{22} - \dot{m}_{EGRHP} + \frac{d}{dt} M_{21} - \dot{m}_{10}.$$

12. The method according to claim 1, characterized in that the preliminary low pressure exhaust gas recirculation mass flow $\dot{m}_{EGRLPDs}$ is determined with the formula $$\dot{m}_{EGRLPDs} = c_2 \sqrt{\frac{1}{T_{EGRVlvLPUs}}} * p_{42} * ar_{EGRVlvLP} * \psi\left(\frac{p_{12}}{p_{42}}\right).$$

13. A computer program which executes a method in accordance with claim 1 on an arithmetic unit or a controller.

14. A computer program product with program code stored on a machine readable carrier, for carrying out a method in accordance with claim 1 when the program is executed on an arithmetic unit or a controller.

15. A method for determining a low pressure exhaust gas recirculation mass flow $\dot{m}_{Opt}$ in an air system of an internal combustion engine (10) with low pressure exhaust gas recirculation, determining by a controller the low pressure exhaust gas recirculation mass flow $\dot{m}_{Opt}$ based on a preliminary low pressure exhaust gas recirculation mass flow $\dot{m}_{EGRLPDs}$ using a function involving a pressure $p_{42}$ upstream and a pressure $p_{12}$ downstream of a low pressure side exhaust gas recirculation valve EGRVIvLP (29), a temperature $T_{EGRVlvPUs}$ upstream of the low pressure side exhaust gas recirculation valve (29), and a geometry $ar_{EGRVlvLP}$ of the low pressure side exhaust gas recirculation valve (29), characterized in that the controller determines the low pressure exhaust gas recirculation mass flow $\dot{m}_{Opt}$ using a mass balance based variable which is a modeled mass flow $\dot{m}_{EGRLPPTN}$ which involves mass flows on an air feed side of the air system;
wherein the controller determines the low pressure exhaust gas recirculation mass flow $\dot{m}_{Opt}$ using a weighting of the preliminary low pressure exhaust gas recirculation mass flow $\dot{m}_{EGRLPDs}$ and the mass balance based mass flow $\dot{m}_{EGRLPPTN}$; and
wherein the determination of the mass balance based mass flow $\dot{m}_{EGRLPPTN}$ includes:
- a mass flow $\dot{m}_{22}$ at an inlet of the internal combustion engine (10), which is a function of the air consumption and/or an engine speed and/or an engine volume and/or a temperature at the inlet of the internal combustion engine (10) and/or a pressure at the inlet of the internal combustion engine (10), and/or
- a measured or modeled high pressure exhaust gas recirculation mass flow $\dot{m}_{EGRHP}$ and/or
- a measured or modeled fresh air mass flow $\dot{m}_{10}$ and/or
- a dynamic correction variable $$\frac{d}{dt} M_{21},$$

which is a function of a volume between a compressor (16b) and a throttle valve (18) of the air system; and
the mass balance based mass flow $\dot{m}_{EGRLPPTN}$ is determined with the formula $$\dot{m}_{EGRLPPTN} = \dot{m}_{22} - \dot{m}_{EGRHP} + \frac{d}{dt} M_{21} - \dot{m}_{10}.$$

16. The method according to claim 15, characterized in that the mass flow $\dot{m}_{22}$ is measured.

17. The method according to claim 15, characterized in that the mass flow $\dot{m}_{22}$ is modeled.

* * * * *